(12) United States Patent
Xie et al.

(10) Patent No.: US 12,405,067 B2
(45) Date of Patent: Sep. 2, 2025

(54) MULTIPURPOSE MULTI-SOURCE HEAT-STORING COMPRESSED AIR ENERGY STORAGE SYSTEM AND METHOD OF SAME

(71) Applicant: CHINA THREE GORGES CORPORATION, Beijing (CN)

(72) Inventors: Ningning Xie, Beijing (CN); Xinxing Lin, Beijing (CN); Likun Yin, Beijing (CN); Changping Sun, Beijing (CN)

(73) Assignee: CHINA THREE GORGES CORPORATION (CN)

( * ) Notice: Subject to any disclaimer, the term of this patent is extended or adjusted under 35 U.S.C. 154(b) by 41 days.

(21) Appl. No.: 18/025,319

(22) PCT Filed: May 25, 2021

(86) PCT No.: PCT/CN2021/095843
§ 371 (c)(1),
(2) Date: Mar. 8, 2023

(87) PCT Pub. No.: WO2022/222219
PCT Pub. Date: Oct. 27, 2022

(65) Prior Publication Data
US 2024/0240876 A1      Jul. 18, 2024

(30) Foreign Application Priority Data

Apr. 19, 2021   (CN) .................... 202110420392.7
Apr. 19, 2021   (CN) .................... 202120800207.2

(51) Int. Cl.
*F28D 20/00*   (2006.01)

(52) U.S. Cl.
CPC ..... *F28D 20/0056* (2013.01); *F28D 20/0034* (2013.01); *F28D 2020/0013* (2013.01); *F28D 2020/0078* (2013.01)

(58) Field of Classification Search
CPC ............ F28D 20/0056; F28D 20/0034; F28D 2020/0013; F28D 2020/0078; F17C 2227/03; F17C 2227/033
See application file for complete search history.

(56) References Cited

FOREIGN PATENT DOCUMENTS

| CN | 204610203 U | 9/2015 |
|---|---|---|
| CN | 107702360 A | 2/2018 |

(Continued)

OTHER PUBLICATIONS

International Search Report of PCT/CN2021/095843.
Written Opinion of PCT/CN2021/095843.

*Primary Examiner* — Travis Ruby

(57) ABSTRACT

The present disclosure provides a multipurpose multi-source heat-storing compressed air energy storage system and a method thereof, including a packed bed heat-storing device, a heat-storing circuit, a heat-releasing circuit, a gas-storing circuit, a photothermal circuit, a heating-supplying circuit and a cooling-supplying circuit, wherein the heat-storing circuit and the heat-releasing circuit are connected to the packed bed heat-storing device, respectively, and the heat-storing heat exchanger of the heat-storing circuit and the heat-releasing heat exchanger of the heat-releasing circuit are connected with the gas-storing circuit, respectively, the photothermal circuit is connected with the heat-storing circuit, the heating-supplying circuit is connected with the heat-releasing circuit and the photothermal circuit, the cooling-supplying circuit is connected to the packed bed heat-storing device and the photothermal circuit, the photothermal circuit heats the heat-storing circuit and the heat-releasing circuit.

15 Claims, 8 Drawing Sheets

(56) References Cited

FOREIGN PATENT DOCUMENTS

| | | | |
|---|---|---|---|
| CN | 109059318 | A | 12/2018 |
| CN | 109140797 | A | 1/2019 |
| CN | 208473942 | U | 2/2019 |
| CN | 112283068 | A | 1/2021 |
| CN | 112524001 | A | 3/2021 |
| WO | 2012177379 | A2 | 12/2012 |

MULTIPURPOSE MULTI-SOURCE HEAT-STORING COMPRESSED AIR ENERGY STORAGE SYSTEM AND METHOD OF SAME

CROSS-REFERENCE TO RELATED APPLICATIONS

This Application is a national stage application of PCT/CN2021/095843. This application claims priorities from PCT Application No. PCT/CN2021/095843, filed May 25, 2021, and from the Chinese patent applications 202120800207.2 and 202110420392.7 filed Apr. 19, 2021, the content of which are incorporated herein in the entirety by reference.

TECHNICAL FIELD

The present disclosure relates to the technical field of energy storage, in particular to a multipurpose multi-source heat-storing compressed air energy storage system and a method thereof.

BACKGROUND

In a compressed air energy storage system, since an air turbine is used to make power generation in the process of energy release, the expansion and cooling action of high-pressure air can generate cooling energy for users during that process, meanwhile not only make use of recycled heat to perform heating up and energy release in the heat-storing subsystem, but also provide users with domestic water and central heating. CN 109826708A disclosed an advanced distributed multi-supplied system with compressed air energy storage and an application method thereof, which involve a power output module, a cooling module, a heating module and other modules, although this solution meets the user's load demand for different seasons, but it is an after-burning type, does not completely achieve zero-pollution. Similarly, CN 10729989113 disclosed an advanced multi-energy complementation cool-heat-electricity-jointly supplying system with compressed air energy storage and an application method thereof, although it includes recycling compressor heat and solar collectors supplying heat, but still adopts an afterburning type circuit. CN 107939654B disclosed a cool-heat-electricity-jointly supplying compressed air energy storage system, which adopts an afterburning type circuit, meanwhile meets different requirements for supplying cool, heat and electricity, but it still needs to further improve in optimization for a heat storage system.

The aforementioned technical solutions cannot concurrently have multipurpose functions such as power output, cooling, heating and gas supply, once the temperature does not reach an operation temperature in the process of energy storage, the turbine efficiency will fall down and the system will be unstable. Secondly, they cannot supply continuous heating and cooling.

SUMMARY

The technical problem of making an energy storage system to be a simple structure, is to be solved by the present disclosure, which provides a multipurpose multi-source heat-storing compressed air energy storage system and a method thereof, wherein a heat-storing circuit and a heat-releasing circuit are connected to a packed bed heat-storing device, respectively, and the heat-storing heat exchanger of the heat-storing circuit and the heat-releasing heat exchanger of the heat-releasing circuit are connected with a gas-storing circuit, respectively, a photothermal circuit is connected with the heat-storing circuit, a heating-supplying circuit is connected with the heat-releasing circuit and the photothermal circuit, a cooling-supplying circuit is connected to the packed bed heat-storing device and the photothermal circuit, the photothermal circuit heats the heat-storing circuit and the heat-releasing circuit, so it concurrently has multipurpose functions, improves the stable do-work performance and efficiency of the system, and realizes continuous heating and cooling.

In order to solve the above technical problem, the technical scheme adopted in the present disclosure is as follows: a multipurpose multi-source heat-storing compressed air energy storage system, comprising a packed bed heat-storing device, a heat-storing circuit, a heat-releasing circuit, a gas-storing circuit, a photothermal circuit, a heating-supplying circuit and a cooling-supplying circuit, wherein the heat-storing circuit and the heat-releasing circuit are connected to the packed bed heat-storing device, respectively, and the heat-storing heat exchanger of the heat-storing circuit and the heat-releasing heat exchanger of the heat-releasing circuit are connected with the gas-storing circuit, respectively, the photothermal circuit is connected with the heat-storing circuit, the heating-supplying circuit is connected with the heat-releasing circuit and the photothermal circuit, the cooling-supplying circuit is connected to the packed bed heat-storing device and the photothermal circuit, and the photothermal circuit heats the heat-storing circuit and the heat-releasing circuit.

The packed bed heat-storing device includes a packed bed and a liquid-storing tank connected to the outlet end of the packed bed, the heat-storing circuit and the heat-releasing circuit are connected to the packed bed and the liquid-storing tank, and a pressure-stabilizing system is connected to the inlet end of the packed bed.

The heat-storing circuit includes a heat-storing pipeline, and a heat-storing heat exchanger and a low-temperature canned motor pump both connected in series to the heat-storing pipeline.

The heat-storing heat exchanger and the heat-releasing heat exchanger are connected to a compressor and an expander, respectively.

The heat-releasing circuit includes a heat-releasing pipeline, and the heat-releasing heat exchanger and a high-temperature canned motor pump both connected in series to the heat-releasing pipeline, and the expansion tank is connected to the heat-releasing pipeline.

The gas-storing circuit includes a gas-storing tank, and an air inlet pipeline and an air outlet pipeline both connected to the gas-storing tank, the air inlet pipeline and the air outlet pipeline are connected to the heat-storing heat exchanger and the heat-releasing heat exchanger, respectively, and a gas source tube is connected to the air outlet pipeline.

The photothermal circuit includes a photothermal pipeline, and a photothermal collector system and an electrical heater both connected in series to the photothermal pipeline, the photothermal pipeline is connected with the heat-storing circuit, the heating-supplying circuit and the cooling-supplying circuit.

The heating-supplying circuit includes a heating-supplying heat exchanger and a heating user terminal connected with the heating-supplying heat exchanger, and the heating-supplying heat exchanger is connected with the heat-releasing circuit and the photothermal circuit.

The cooling-supplying circuit includes an absorption refrigerating system and a cooling user terminal connected to the absorption refrigerating system, and the absorption refrigerating system is connected with the heat-storing circuit and the photothermal circuit.

An energy storage and energy release method of the multipurpose multi-source heat-storing compressed air energy storage system as above, comprising the following steps.

S1, an energy storage step implemented by starting the compressor and the low-temperature canned motor pump so as to convert the high-temperature and high-pressure air into low-temperature and high-pressure air and store the latter in the gas-storing tank, wherein this step includes the following sub-steps:

S1-1, making the high-temperature and high-pressure air discharged from the compressor enter the heat-storing heat exchanger, which absorbs heat then performs heat conversion with the low-temperature heat-transferring liquid medium in the heat-storing circuit;

S1-2, making the heat-transferring liquid medium in the liquid-storing tank enter the heat-storing circuit, in which the heat-transferring liquid medium is driven by the low-temperature canned motor pump to continuously circulate and continuously absorbs the heat of the heat-storing heat exchanger; simultaneously making the low-temperature and high-pressure air formed after cooling the high-temperature and high-pressure air enter the gas-storing tank for storage; and S1-3, when the heat-transferring liquid medium in the liquid-storing tank reaches a preset temperature value or the low-temperature and high-pressure air in the gas-storing tank reaches a preset value, ending the energy storage process;

S2, an energy release step implemented by starting the high-temperature canned motor pump so as to convert the low-temperature and high-pressure air in the gas-storing tank into the high-temperature and high-pressure air and deliver the latter to the expander to do work, wherein this step includes the following sub-steps;

S2-1, making the low-temperature and high-pressure air in the gas-storing tank enter the heat-releasing heat exchanger, which absorbs heat then performs heat conversion with the low-temperature and high-pressure air in the gas-storing circuit;

S2-2, making the heat-transferring liquid medium in the liquid-storing tank enter the heat-releasing circuit, in which the heat-transferring liquid medium is driven by the high-temperature canned motor pump to continuously circulate and continuously conducts its heat to the heat-releasing heat exchanger; simultaneously making the high-temperature and high-pressure air formed from the low-temperature and high-pressure air after absorbing heat drive the expander to do work; and S2-3, when the release of the low-temperature and high-pressure air in the gas-storing tank reaches a preset value or the temperature of the heat-transferring liquid medium in the liquid-storing tank reaches a preset value, ending the energy release process;

S3, an electrically heating step implemented by making the heat-transferring liquid medium in the liquid-storing tank enter the photothermal circuit under the drive of the low-temperature canned motor pump, then enter the packed bed after being heated by the electrical heater, next flow back to the liquid-storing tank, in that case that the compressor is not in operation;

S4, a photothermally heating step implemented by making the heat-transferring liquid medium in the liquid-storing tank enter the photothermal circuit under the drive of the low-temperature canned motor pump, then enter the packed bed after being heated by the photothermal collector system, next flow back to the liquid-storing tank, in that case that the compressor is not in operation;

S5, a heating-supplying step implemented by making the heat-transferring liquid medium in the liquid-storing tank enter the heat-releasing circuit, then enter the packed bed after entering the heating-supplying circuit under the drive of the high-temperature canned motor pump, next flow back to the liquid-storing tank, making the heating-supplying heat exchanger continuously absorb the heat of the heat-transferring liquid medium, then deliver the heat to the heating user terminal after absorbing the heat, in this process;

S6, a cooling-supplying step implemented by making the heat-transferring liquid medium in the liquid-storing tank enter the heat-releasing circuit, then enter the absorption refrigerating system under the drive of the high-temperature canned motor pump, then making the absorption refrigerating system continuously absorb the heat of the heat-transferring liquid medium to do work for refrigeration, then supply cooling to the cooling user terminal, next making the heat-transferring liquid medium flow back to the liquid-storing tank; and S7, a gas-supplying step implemented by opening the gas source tube to make the low-temperature and high-pressure air in the gas-storing tank enter the gas source tube; making the air outlet pipeline turn off and the air inlet pipeline turn on, of the gas-storing tank, in the off-state of the heat-releasing circuit in S1; making the air outlet pipeline turn on and the air inlet pipeline turn off, of the gas-storing tank, in the on-state of the heat-storing circuit in S2.

A multipurpose multi-source heat-storing compressed air energy storage system and a method thereof, include a packed bed heat-storing device, a heat-storing circuit, a heat-releasing circuit, a gas-storing circuit, a photothermal circuit, a heating-supplying circuit and a cooling-supplying circuit, wherein the heat-storing circuit and the heat-releasing circuit are connected to the packed bed heat-storing device, respectively, and the heat-storing heat exchanger of the heat-storing circuit and the heat-releasing heat exchanger of the heat-releasing circuit are connected with the gas-storing circuit, respectively, the photothermal circuit is connected with the heat-storing circuit, the heating-supplying circuit is connected with the heat-releasing circuit and the photothermal circuit, the cooling-supplying circuit is connected to the packed bed heat-storing device and the photothermal circuit, the photothermal circuit heats the heat-storing circuit and the heat-releasing circuit. The present disclosure overcomes the problem of the incapacity of the traditional system for multipurpose functions, and the system instability caused by the reduction of do-work efficiency at the temperature failing to meet requirements in the energy storage process, and it concurrently provides a simple structure and multipurpose functions, improves the stable do-work performance and efficiency of the system, and realizes continuous heating and cooling.

Wherein, 1—packed bed heat-storing device, 11—packed bed, 12—liquid-storing tank, 13—pressure-stabilizing system, 2—heat-storing circuit, 21—heat-storing heat exchanger, 22—low-temperature canned motor pump, 23—compressor, 3—heat-releasing circuit, 31—heat-releasing heat exchanger, 32—high-temperature canned motor pump, 33—expander, 34—expansion tank, 4—gas-storing circuit, 41—gas-storing tank, 42—gas source tube, 5—photothermal circuit, 51—photothermal collector system, 52—electrical heater, 6—heating-supplying circuit, 61—heating-supplying heat exchanger, 62—heating user terminal, 7—cooling-supplying circuit, 71—absorption refrigerating system, 72—cooling user terminal.

DETAILED DESCRIPTION OF SOME EMBODIMENTS

We shall describe the present disclosure in conjunction with the drawings and examples as follows.

Figure 1:
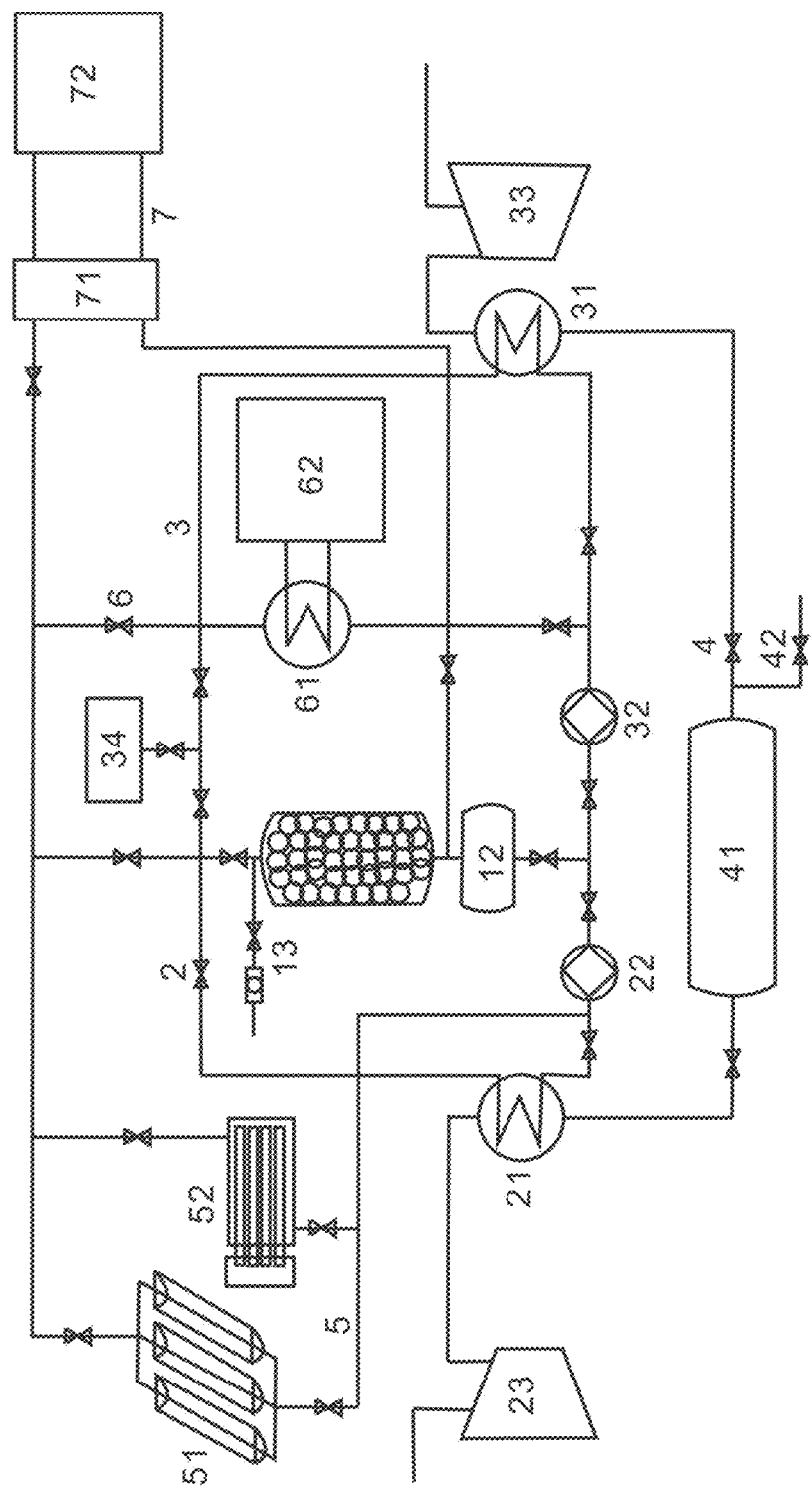
FIG. 1 shows a structure diagram of the present disclosure.
Figure 2:
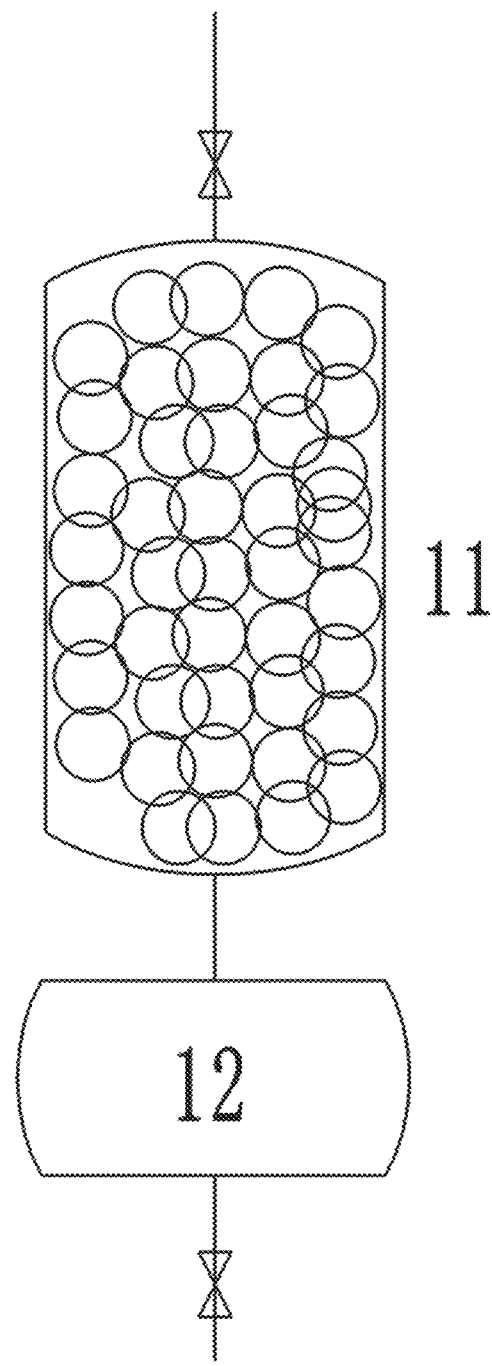
FIG. 2 shows a structure diagram of the packed bed heat-storing device according to the present disclosure.
Figure 3:
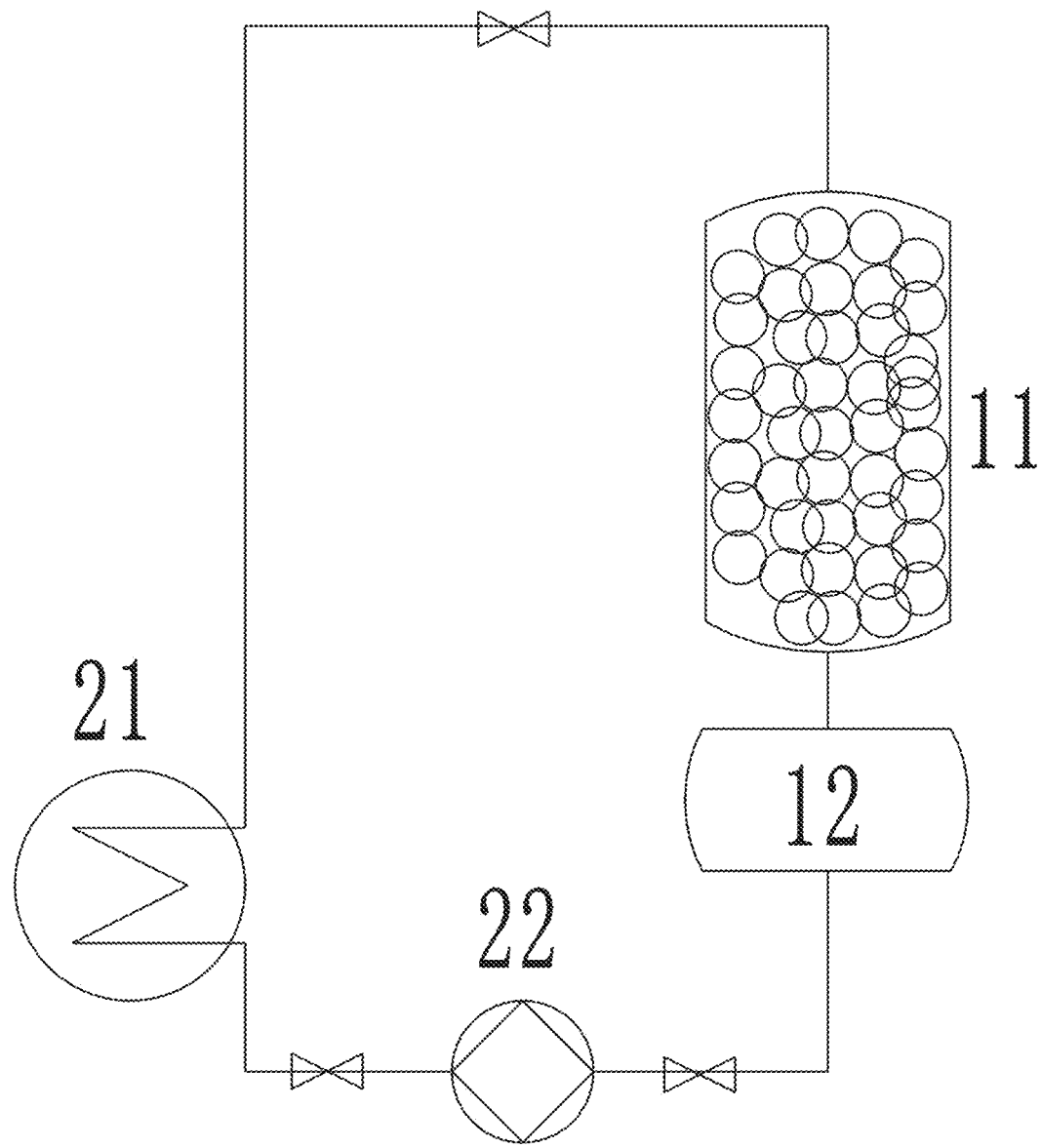
FIG. 3 shows a structure diagram of the heat-storing circuit according to the present disclosure.
Figure 4:
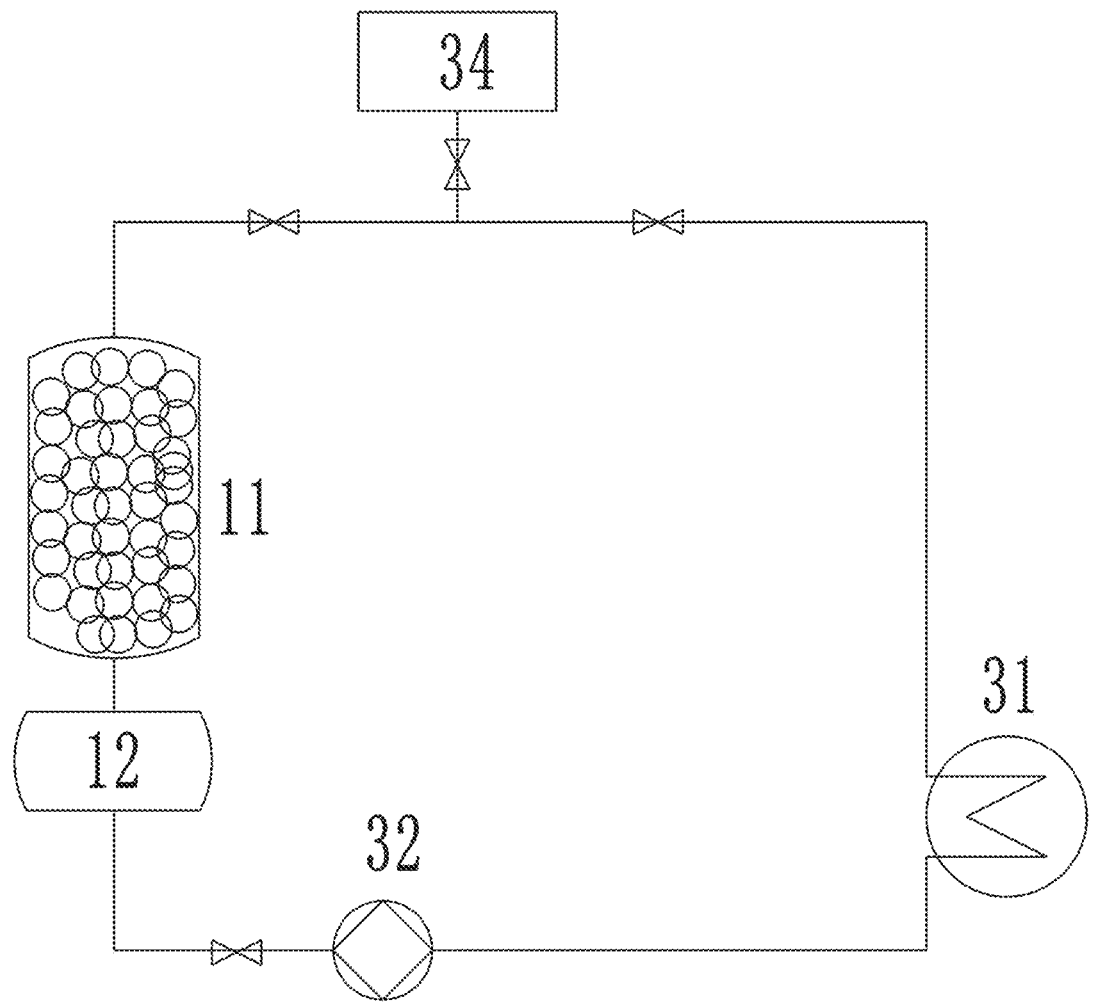
FIG. 4 shows a structure diagram of the heat-releasing circuit according to the present disclosure.
Figure 5:
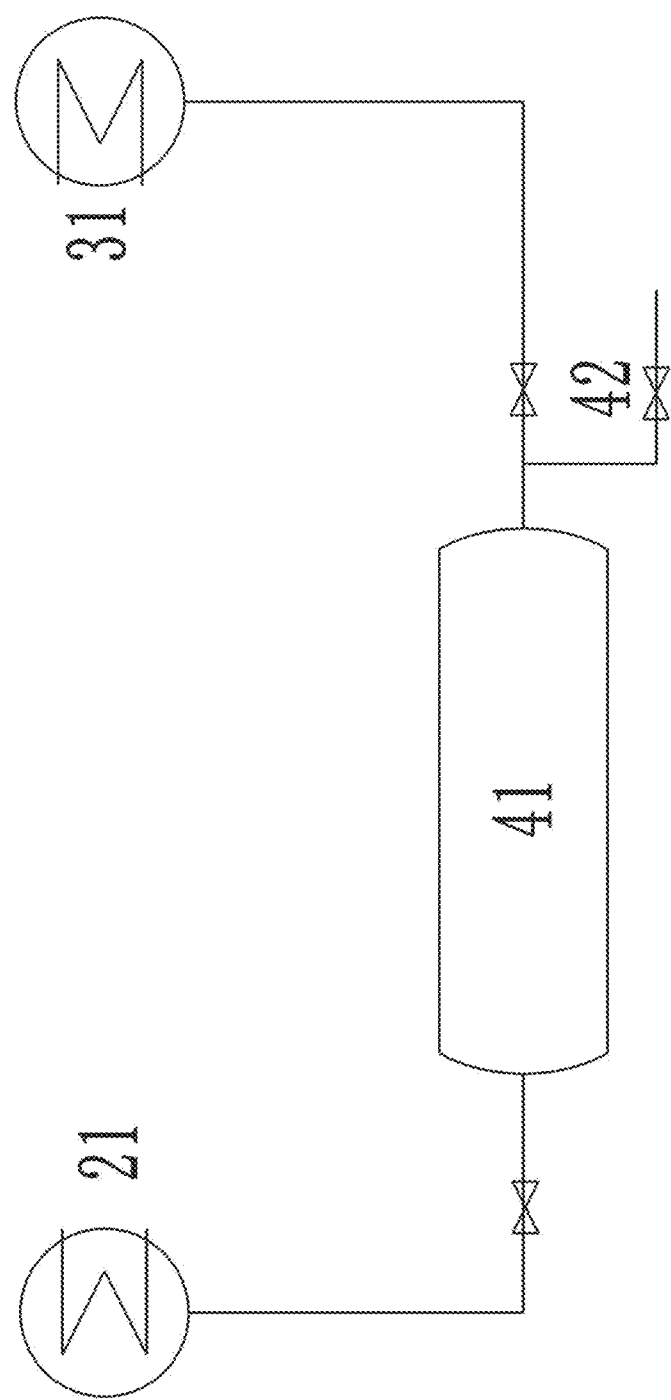
FIG. 5 shows a structure diagram of the gas-storing circuit according to the present disclosure.
Figure 6:
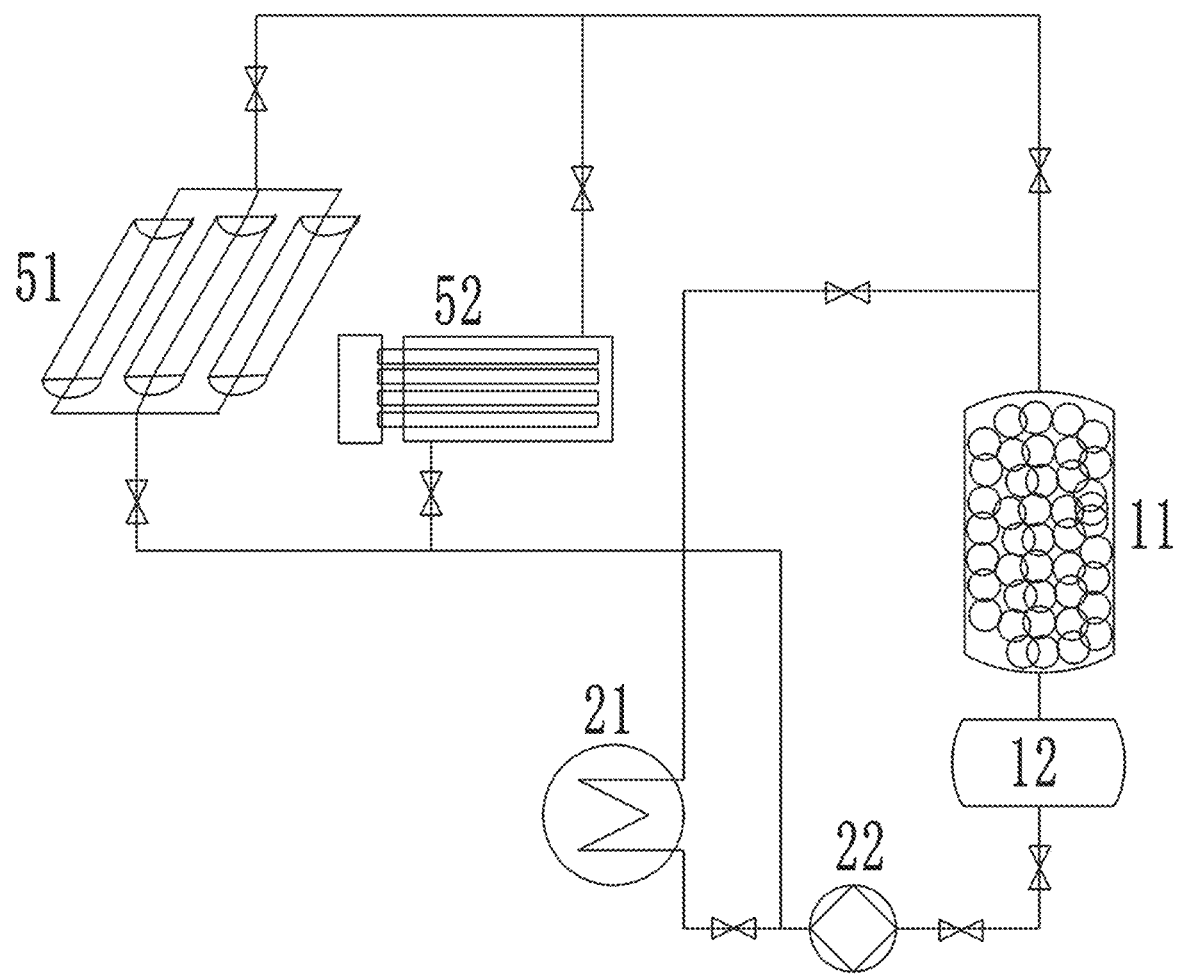
FIG. 6 shows a structure diagram of the connection of the heat-storing circuit between the photothermal circuit the according to the present disclosure.
Figure 7:
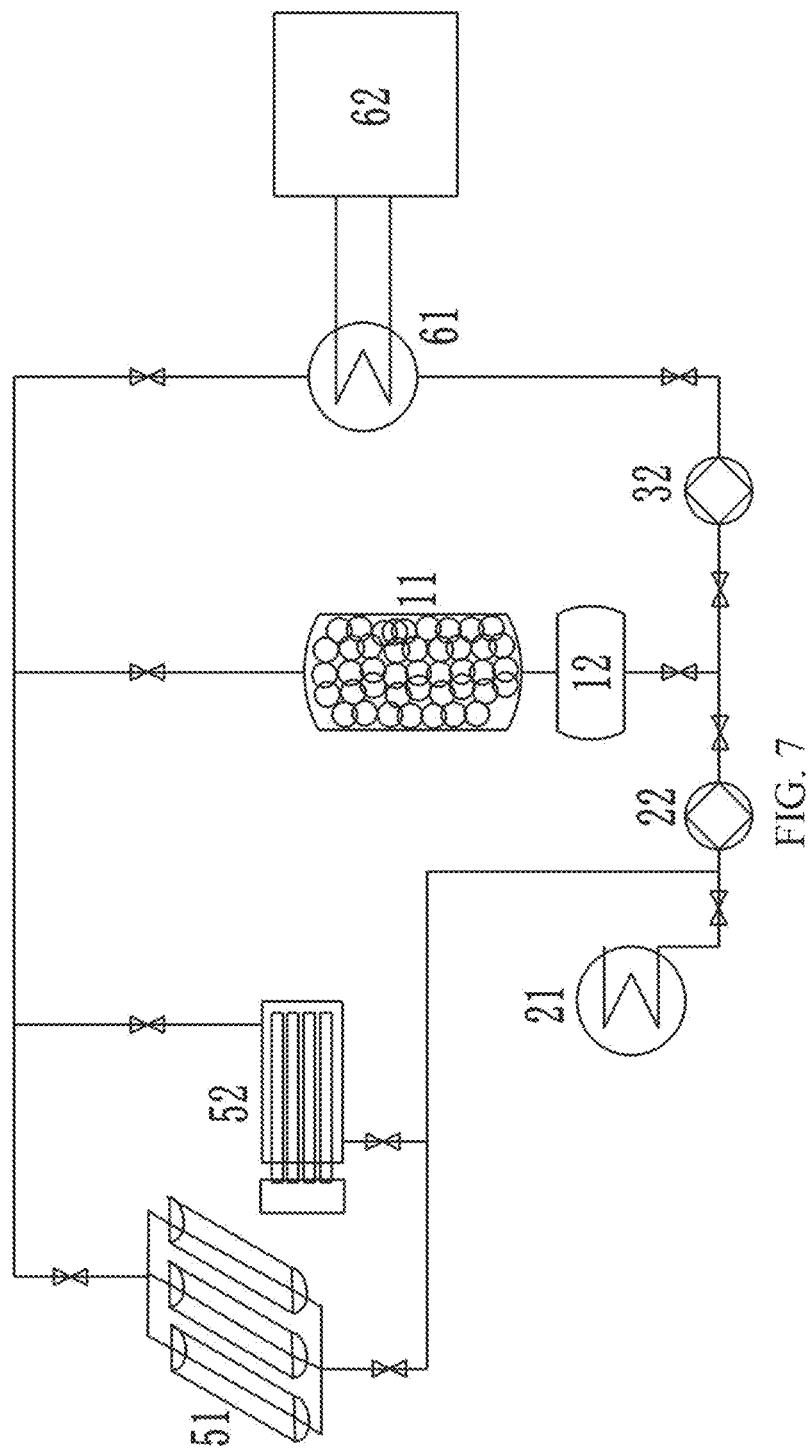
FIG. 7 shows a structure diagram of the heating-supplying circuit according to the present disclosure.
Figure 8:
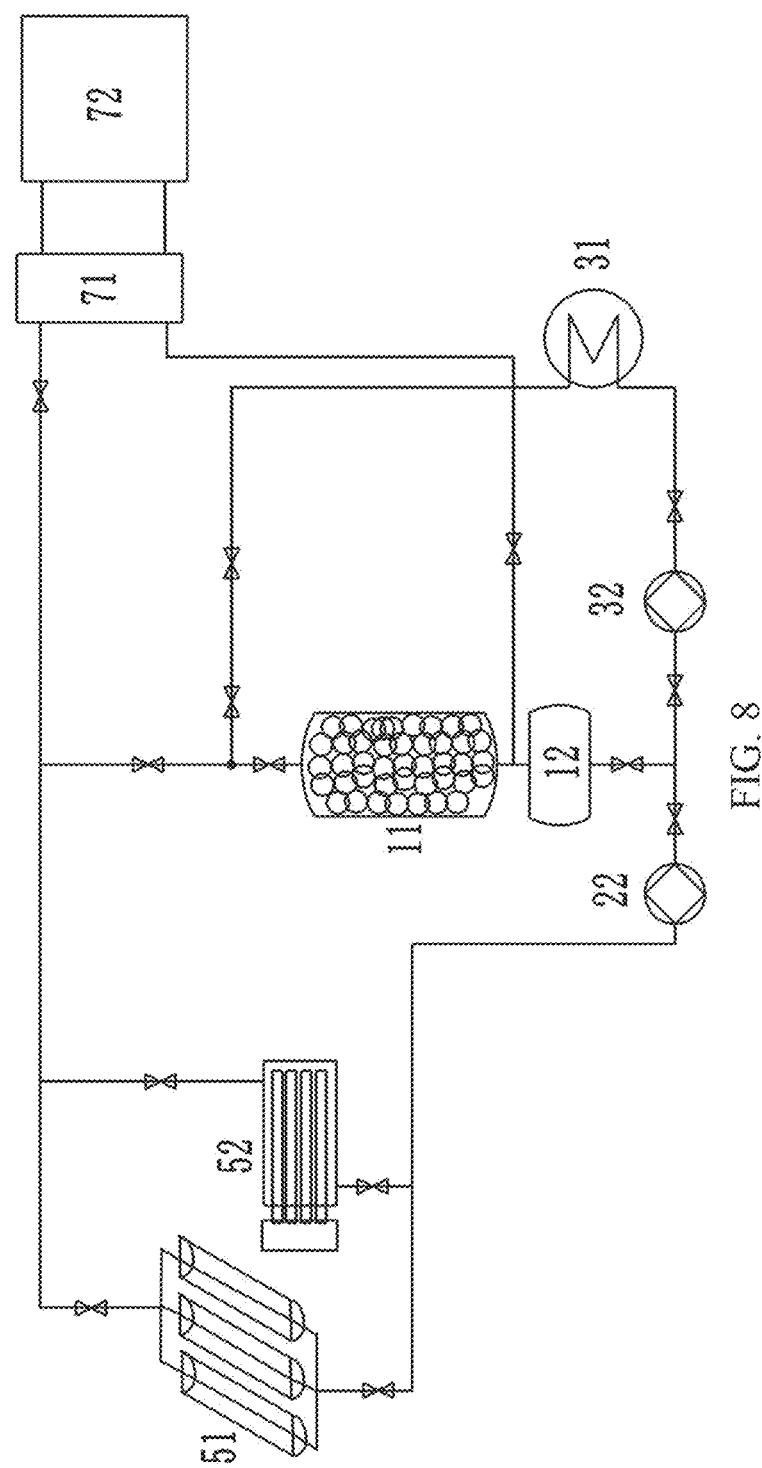
FIG. 8 shows a structure diagram of the cooling-supplying circuit according to the present disclosure.

As shown in FIGS. 1~8, the multipurpose multi-source heat-storing compressed air energy storage system, includes the packed bed heat-storing device 1, the heat-storing circuit 2, the heat-releasing circuit 3, the gas-storing circuit 4, the photothermal circuit 5, the heating-supplying circuit 6 and the cooling-supplying circuit 7, wherein the heat-storing circuit 2 and the heat-releasing circuit 3 are connected to the packed bed heat-storing device 1, respectively, and the heat-storing heat exchanger 21 of the heat-storing circuit 2 and the heat-releasing heat exchanger 31 of the heat-releasing circuit 3 are connected with the gas-storing circuit 4, respectively, the photothermal circuit 5 is connected with the heat-storing circuit 2, the heating-supplying circuit 6 is connected with the heat-releasing circuit 3 and the photothermal circuit 5, the cooling-supplying circuit 7 is connected to the packed bed heat-storing device 1 and the photothermal circuit 5, the photothermal circuit 5 heats the heat-storing circuit 2 and the heat-releasing circuit 3. It concurrently has multipurpose functions, improves the stable do-work performance and efficiency of the system, and realizes continuous heating and cooling.

In a preferred solution, the packed bed heat-storing device 1 includes the liquid-storing tank 12 connected to the outlet end of the packed bed 11, the heat-storing circuit 2 and the heat-releasing circuit 3 are connected to the packed bed 11 and the liquid-storing tank 12; the pressure-stabilizing system 13 is connected to the inlet end of the packed bed 11. This solution provides a simple structure, during operation, the packed bed 11 is used to absorb the heat of a heat-transferring liquid medium, and the liquid-storing tank 12 is used to store the heat-transferring liquid medium discharged from the packed bed 11.

Preferably, the pressure-stabilizing system 13 connected to the inlet end of the packed bed 11 is used to discharge out the air in the circuit before starting of the system.

Preferably, the pressure-stabilizing system 13 includes a pressure-stabilizing device and a gas flow regulating valve both connected with each other in proper order within the pressure-stabilizing pipeline, and one end of the gas flow regulating valve is connected to the inlet end of the packed bed 11.

In a preferred solution, the heat-storing circuit 2 includes the heat-storing heat exchanger 21 and the low-temperature canned motor pump 22 both connected in series to the heat-storing pipeline. This solution provides a simple structure, during operation, the heat-releasing circuit 3 turns off, the heat-transferring liquid medium is discharged from the liquid-storing tank 12 into the heat-storing circuit 2, and the low-temperature canned motor pump 22 drives the heat-transferring liquid medium in the heat-storing pipeline to circularly flow, the heat-transferring liquid medium continuously absorbs the heat of the heat-storing heat exchanger 21, the temperature of the heat-transferring liquid medium gradually increases, meanwhile the heat-storing heat exchanger 21 converts the high-temperature and high-pressure air into low-temperature and high-pressure air.

In a preferred solution, the heat-storing heat exchanger 21 and the heat-releasing heat exchanger 31 are connected with the compressor 23 and the expander 33, respectively. This solution provides a simple structure, during operation, the compressor 23 does work to convert the room-temperature air into high-temperature and high-pressure air, and then deliver it to the heat-storing heat exchanger 21, the high-temperature and high-pressure air discharged from the heat-releasing heat exchanger 31 drives the expander 33 to do work.

In a preferred solution, the heat-releasing circuit 3 includes the heat-releasing heat exchanger 31 and the high-temperature canned motor pump 32 both connected in series to the heat-releasing pipeline; the expansion tank 34 is connected to the heat-releasing pipeline. This solution provides a simple structure, during operation, the heat-storing circuit 2 turns off, the heat-transferring liquid medium is discharged from the liquid-storing tank 12 into the heat-releasing circuit 3, and the high-temperature canned motor pump 32 drives the heat-transferring liquid medium in the heat-releasing pipeline to circularly flow, the heat-releasing heat exchanger 31 continuously absorbs the heat of the heat-transferring liquid medium, the temperature of the heat-releasing heat exchanger 31 gradually increases, meanwhile the heat-releasing heat exchanger 31 converts the low-temperature and high-pressure air into high-temperature and high-pressure air.

Preferably, the expansion tank 34 is used to offset the pressure on the heat-releasing pipeline at a sharp temperature rise of the heat-transferring liquid medium during the energy release process. Its operation process is that when the pressure of the heat-releasing pipeline rises sharply, part of the heat-transferring liquid media quickly enter the expansion tank 34, reducing the pressure of the heat-releasing pipeline and avoiding the pipeline from bursting.

In a preferred solution, the gas-storing circuit 4 includes an air inlet pipeline and an air outlet pipeline both connected to the gas-storing tank 41, the air inlet pipeline and the air outlet pipeline are connected to the heat-storing heat exchanger 21 and the heat-releasing heat exchanger 31, respectively, and the gas source tube 42 is connected to the air outlet pipeline. This solution provides a simple structure, during operation, in the heat storage stage, the gas-storing tank 41 receives and stores the low-temperature and high-pressure air discharged by the heat-storing heat exchanger 21, in the energy release stage, the gas-storing tank 41 discharges and delivers the low-temperature and high-pressure air to the heat-releasing heat exchanger 31; in the case that the gas-storing tank 41 has a stored gas, it can deliver the gas to the gas source tube 42 at any time, acting as a gas source.

In a preferred solution, the photothermal circuit 5 includes the photothermal collector system 51 and the electrical heater 52 both connected in series to a photothermal pipeline, and the photothermal pipeline is connected with the heat-storing circuit 2, the heating-supplying circuit 6 and the cooling-supplying circuit 7. This solution provides a simple structure, during operation, the heat-transferring liquid medium is discharged from the liquid-storing tank 12 into the heat-storing circuit 2, the low-temperature canned motor pump 22 drives the heat-transferring liquid medium in the heat-storing pipeline to run into the photothermal circuit 5 and then enter the packed bed 11, next flow back to the liquid-storing tank 12, forming a cyclic circuit, thus the photothermal collector system 51 or the electrical heater 52 heats the heat-transferring liquid medium.

Preferably, in the energy release stage, the low-temperature canned motor pump 22 starts accordingly, after it drives the heat-transferring liquid medium in the liquid-storing tank 12 to discharge from the latter, part of the heat-transferring liquid media enter the heat-releasing circuit 3, and the other part of the heat-transferring liquid media are driven by the low-temperature canned motor pump 22 into the photothermal circuit 5 for heating, then enter the packed bed 11, next return to the liquid-storing tank 12 for heating the heat-transferring liquid medium heating in the energy release stage.

In a preferred solution, the heating-supplying circuit 6 includes the heating user terminal 62 connected with the heating-supplying heat exchanger 61, and the heating-supplying heat exchanger 61 is connected with the heat-releasing circuit 3 and the photothermal circuit 5. This solution provides a simple structure, during operation, the heat-transferring liquid medium in the liquid-storing tank 12 enters the heat-releasing circuit 3, the high-temperature canned motor pump 32 drives the heat-transferring liquid medium to run into the heating-supplying heat exchanger 61 of the heating-supplying circuit 6 and then enter the packed bed 11, next flow back to the liquid-storing tank 12, the heating-supplying heat exchanger 61 continuously absorbs the heat of the heat-transferring liquid medium, the heating-supplying heat exchanger 61 absorbs the heat then transports it to the heating user terminal 62.

Preferably, when the packed bed heat-storing device 1 stays in the off-state, the low-temperature canned motor pump 22 or the high-temperature canned motor pump 32 starts, and drives the heat-transferring liquid medium to run into the high-temperature canned motor pump 32 via the low-temperature canned motor pump 22, the photothermal circuit 5 and the heating-supplying circuit 6, then flow back to the low-temperature canned motor pump 22, so the photothermal circuit 5 directly supplies high-temperature and high-pressure air to the heating-supplying circuit 6.

In a preferred solution, the cooling-supplying circuit 7 includes the cooling user terminal 72 connected to the absorption refrigerating system 71, and the absorption refrigerating system 71 is connected with the heat-storing circuit 2 and the photothermal circuit 5. This solution provides a simple structure, during operation, the heat-transferring liquid medium in the liquid-storing tank 12 enters the heat-releasing circuit 3, the high-temperature canned motor pump 32 drives the heat-transferring liquid medium to run into the absorption refrigerating system 71 via the heat-releasing circuit 3, the absorption refrigerating system 71 does work and makes refrigeration to the cooling user terminal 72, then the heat-transferring liquid medium flows back to the liquid-storing tank 12, forming a cyclic circuit, in this process the heat-transferring liquid medium does not pass through the packed bed 11.

Preferably, the heat-transferring liquid medium in the liquid-storing tank 12 enters the heat-storing circuit 2, the low-temperature canned motor pump 22 drives the heat-transferring liquid medium to run into the cooling-supplying circuit 7 via the low-temperature canned motor pump 22 and the photothermal circuit 5, then flow back to the liquid-storing tank 12, forming a circulation; in this process, the heat-transferring liquid medium does not pass through the packed bed 11, or by the midway passage of the heat-transferring liquid medium entering cooling-supplying circuit 7 from the photothermal circuit 5, part of the heat-transferring liquid media flow through the cooling-supplying circuit 7 and then flow back to the liquid-storing tank 12, and the other part flow back to the liquid-storing tank 12 after passing through the packed bed 11.

Preferably, the heat-transferring liquid medium in the liquid-storing tank 12 enters the heat-storing circuit 2, the low-temperature canned motor pump 22 drives the heat-transferring liquid medium to run into the cooling-supplying circuit 7 via the low-temperature canned motor pump 22 and the heat-storing heat exchanger 21, then flow back to the liquid-storing tank 12, forming a circulation; in this process, the heat-transferring liquid medium does not pass through the packed bed 11, or by the midway passage of the heat-transferring liquid medium entering cooling-supplying circuit 7 from the heat-storing heat exchanger 21, part of the heat-transferring liquid media flow through the cooling-supplying circuit 7 and then flow back to the liquid-storing tank 12, and the other part flow back to the liquid-storing tank 12 after passing through the packed bed 11.

In a preferred solution, an energy storage and energy release method of the multipurpose multi-source heat-storing compressed air energy storage system as above, comprising the following steps:

S1, an energy storage step implemented by starting the compressor 23 and the low-temperature canned motor pump 22 so as to convert the high-temperature and high-pressure air into low-temperature and high-pressure air and store the latter in the gas-storing tank 41, wherein this step includes the following sub-steps:

S1-1, making the high-temperature and high-pressure air discharged from the compressor 23 enter the heat-storing heat exchanger 21, which absorbs heat then performs heat conversion with the low-temperature heat-transferring liquid medium in the heat-storing circuit 2;

S1-2, making the heat-transferring liquid medium in the liquid-storing tank 12 enter the heat-storing circuit 2, in which the heat-transferring liquid medium is driven by the low-temperature canned motor pump 22 to continuously circulate and continuously absorbs the heat of the heat-storing heat exchanger 21; simultaneously making the low-temperature and high-pressure air formed after cooling the high-temperature and high-pressure air enter the gas-storing tank 41 for storage; and S1-3, when the heat-transferring liquid medium in the liquid-storing tank 12 reaches a preset temperature value or the low-temperature and high-pressure air in the gas-storing tank 41 reaches a preset value, ending the energy storage process;

S2, an energy release step implemented by starting the high-temperature canned motor pump 32 so as to convert the low-temperature and high-pressure air in the gas-storing tank 41 into the high-temperature and high-pressure air and deliver the latter to the expander 33 to do work, wherein this step includes the following sub-steps:

S2-1, making the low-temperature and high-pressure air in the gas-storing tank 41 enter the heat-releasing heat exchanger 31, which absorbs heat then performs heat conversion with the low-temperature and high-pressure air in the gas-storing circuit 4;

S2-2, making the heat-transferring liquid medium in the liquid-storing tank 12 enter the heat-releasing circuit 3, in which the heat-transferring liquid medium is driven by the high-temperature canned motor pump 32 to continuously circulate and continuously conducts its heat to the heat-releasing heat exchanger 21; simultaneously making the high-temperature and high-pressure air formed from the low-temperature and high-pressure air after absorbing heat drive the expander 33 to do work; and S2-3, when the release of the low-temperature and high-pressure air in the gas-storing tank 41 reaches a preset value or the temperature of the heat-transferring liquid medium in the liquid-storing tank 12 reaches a preset value, ending the energy release process;

S3, an electrically heating step implemented by making the heat-transferring liquid medium in the liquid-storing tank 12 enter the photothermal circuit 5 under the drive of the low-temperature canned motor pump 22, then enter the packed bed 11 after being heated by the electrical heater 52, next flow back to the liquid-storing tank 12, in that case that the compressor 23 is not in operation;

S4, a photothermally heating step implemented by making the heat-transferring liquid medium in the liquid-storing tank 12 enter the photothermal circuit 5 under the drive of the low-temperature canned motor pump 22, then enter the packed bed 11 after being heated by the photothermal collector system 51, next flow back to the liquid-storing tank 12, in that case that the compressor 23 is not in operation;

S5, a heating-supplying step implemented by making the heat-transferring liquid medium in the liquid-storing tank 12 enter the heat-releasing circuit 3, then enter the packed bed 11 after entering the heating-supplying circuit 6 under the drive of the high-temperature canned motor pump 32, next flow back to the liquid-storing tank 12; making the heating-supplying heat exchanger 61 continuously absorb the heat of the heat-transferring liquid medium, then deliver the heat to the heating user terminal 62 after absorbing the heat, in this process;

S6, a cooling-supplying step implemented by making the heat-transferring liquid medium in the liquid-storing tank 12 enter the heat-releasing circuit 3, then enter the absorption refrigerating system 71 under the drive of the high-temperature canned motor pump 32, then making the absorption refrigerating system 71 continuously absorb the heat of the heat-transferring liquid medium to do work for refrigeration, then supply cooling to the cooling user terminal 72, next making the heat-transferring liquid medium flow back to the liquid-storing tank 12; and S7, a gas-supplying step implemented by opening the gas source tube 42 to make the low-temperature and high-pressure air in the gas-storing tank 41 enter the gas source tube 42; making the air outlet pipeline turn off and the air inlet pipeline turn on, of the gas-storing tank 41, in the off-state of the heat-releasing circuit 3 in S1; making the air outlet pipeline turn on and the air inlet pipeline turn off, of the gas-storing tank 41, in the on-state of the heat-storing circuit 2 in S2. In this method, heating the heat-storing circuit 2 enables the temperature of the heat-transferring liquid medium to increase, and multipurpose functions of heating, cooling and gas supply are conducive to improving the stable do-work performance and efficiency of the system and realizing continuous heating and cooling.

The above embodiments are only preferred technical solutions of the present disclosure, and should not be regarded as limiting the present disclosure. The embodiments in the present application and the features in the embodiments can be arbitrarily combined with each other without conflict. The scope of protection of the present disclosure shall be the technical solutions recorded in the claims, including the equivalent alternatives of the technical features in the technical solutions recorded in the claims. Equivalent substitutions and improvements in the scope are also included in the scope of protection of the present disclosure.

What is claimed is:

1. A multipurpose multi-source heat-storing compressed air energy storage system, comprising a packed bed heat-storing device (1), a heat-storing circuit (2), a heat-releasing circuit (3), a gas-storing circuit (4), a photothermal circuit (5), a heating-supplying circuit (6) and a cooling-supplying circuit (7), wherein said heat-storing circuit (2) and said heat-releasing circuit (3) are connected to said packed bed heat-storing device (1), respectively, and the heat-storing heat exchanger (21) of said heat-storing circuit (2) and the heat-releasing heat exchanger (31) of said heat-releasing circuit (3) are connected with said gas-storing circuit (4), respectively, said photothermal circuit (5) is connected with said heat-storing circuit (2), said heating-supplying circuit (6) is connected with said heat-releasing circuit (3) and said photothermal circuit (5), said cooling-supplying circuit (7) is connected to said packed bed heat-storing device (1) and said photothermal circuit (5), and said photothermal circuit (5) heats said heat-storing circuit (2) and said heat-releasing circuit (3), wherein, the heat-storing circuit (2) includes a heat-storing pipeline, and a heat-storing heat exchanger (21) and a low-temperature canned motor pump (22) both connected in series to the heat-storing pipeline, the heat-storing heat exchanger (21) and the heat-releasing heat exchanger (31) are connected to a compressor (23) and an expander (33), respectively, the heat-releasing circuit (3) includes a heat-releasing pipeline, and the heat-releasing heat exchanger (31) and a high-temperature canned motor pump (32) both connected in series to the heat-releasing pipeline, and the expansion tank (34) is connected to the heat-releasing pipeline, wherein, when the heat-releasing circuit (3) turns off and the heat-storing circuit (2) turns off, the heat-storing heat exchanger (21) converts high-temperature and high-pressure air into low-temperature and high-pressure air, and the heat-releasing heat exchanger (31) converts low-temperature and high-pressure air into high-temperature and high-pressure air, respectively.

2. The multipurpose multi-source heat-storing compressed air energy storage system according to claim 1, wherein said packed bed heat-storing device (1) includes a packed bed (11) and a liquid-storing tank (12) connected to the outlet end of the packed bed (11), said heat-storing circuit (2) and said heat-releasing circuit (3) are connected to the packed bed (11) and the liquid-storing tank (12), and a pressure-stabilizing system (13) is connected to the inlet end of the packed bed (11).

3. The multipurpose multi-source heat-storing compressed air energy storage system according to claim 1, wherein said gas-storing circuit (4) includes a gas-storing tank (41), and an air inlet pipeline and an air outlet pipeline both connected to the gas-storing tank (41), the air inlet pipeline and the air outlet pipeline are connected to the heat-storing heat exchanger (21) and the heat-releasing heat exchanger (31), respectively, and a gas source tube (42) is connected to the air outlet pipeline.

4. The multipurpose multi-source heat-storing compressed air energy storage system according to claim 1, wherein said photothermal circuit (5) includes a photothermal pipeline, and a photothermal collector system (51) and an electrical heater (52) both connected in series to the photothermal pipeline, the photothermal pipeline is connected with said heat-storing circuit (2), said heating-supplying circuit (6) and said cooling-supplying circuit (7).

5. The multipurpose multi-source heat-storing compressed air energy storage system according to claim 1, wherein said heating-supplying circuit (6) includes a heating-supplying heat exchanger (61) and a heating user terminal (62) connected with the heating-supplying heat exchanger (61), and the heating-supplying heat exchanger (61) is connected with said heat-releasing circuit (3) and said photothermal circuit (5).

6. The multipurpose multi-source heat-storing compressed air energy storage system according to claim 1, wherein said cooling-supplying circuit (7) includes an absorption refrigerating system (71) and a cooling user terminal (72) connected to the absorption refrigerating system (71), and the absorption refrigerating system (71) is connected with said heat-storing circuit (2) and said photothermal circuit (5).

7. An energy storage and energy release method of the multipurpose multi-source heat-storing compressed air energy storage system according to claim 1, comprising the following steps:
S1, an energy storage step implemented by starting the compressor (23) and the low-temperature canned motor pump (22) so as to convert the high-temperature and high-pressure air into low-temperature and high-pressure air and store the latter in the gas-storing tank (41), wherein this step includes the following sub-steps:
S1-1, making the high-temperature and high-pressure air discharged from the compressor (23) enter the heat-storing heat exchanger (21), which absorbs heat then performs heat conversion with the low-temperature heat-transferring liquid medium in said heat-storing circuit (2);
S1-2, making the heat-transferring liquid medium in the liquid-storing tank (12) enter said heat-storing circuit (2), in which the heat-transferring liquid medium is driven by the low-temperature canned motor pump (22) to continuously circulate and continuously absorbs the heat of the heat-storing heat exchanger (21); simultaneously making the low-temperature and high-pressure air formed after cooling the high-temperature and high-pressure air enter the gas-storing tank (41) for storage; and
S1-3, when the heat-transferring liquid medium in the liquid-storing tank (12) reaches a preset temperature value or the low-temperature and high-pressure air in the gas-storing tank (41) reaches a preset value, ending the energy storage process;
S2, an energy release step implemented by starting the high-temperature canned motor pump (32) so as to convert the low-temperature and high-pressure air in the gas-storing tank (41) into the high-temperature and high-pressure air and deliver the latter to the expander (33) to do work, wherein this step includes the following sub-steps:
S2-1, making the low-temperature and high-pressure air in the gas-storing tank (41) enter the heat-releasing heat exchanger (31), which absorbs heat then performs heat conversion with the low-temperature and high-pressure air in said gas-storing circuit (4);
S2-2, making the heat-transferring liquid medium in the liquid-storing tank (12) enter said heat-releasing circuit (3), in which the heat-transferring liquid medium is driven by the high-temperature canned motor pump (32) to continuously circulate and continuously conducts its heat to the heat-releasing heat exchanger (21); simultaneously making the high-temperature and high-pressure air formed from the low-temperature and high-pressure air after absorbing heat drive the expander (33) to do work; and
S2-3, when the release of the low-temperature and high-pressure air in the gas-storing tank (41) reaches a preset value or the temperature of the heat-transferring liquid medium in the liquid-storing tank (12) reaches a preset value, ending the energy release process;
S3, an electrically heating step implemented by making the heat-transferring liquid medium in the liquid-storing tank (12) enter said photothermal circuit (5) under the drive of the low-temperature canned motor pump (22), then enter the packed bed (11) after being heated by the electrical heater (52), next flow back to the liquid-storing tank (12), in that case that the compressor (23) is not in operation;
S4, a photothermally heating step implemented by making the heat-transferring liquid medium in the liquid-storing tank (12) enter said photothermal circuit (5) under the drive of the low-temperature canned motor pump (22), then enter the packed bed (11) after being heated by the photothermal collector system (51), next flow back to the liquid-storing tank (12), in that case that the compressor (23) is not in operation;
S5, a heating-supplying step implemented by making the heat-transferring liquid medium in the liquid-storing tank (12) enter said heat-releasing circuit (3), then enter the packed bed (11) after entering said heating-supplying circuit (6) under the drive of the high-temperature canned motor pump (32), next flow back to the liquid-storing tank (12); making the heating-supplying heat exchanger (61) continuously absorb the heat of the heat-transferring liquid medium, then deliver the heat to the heating user terminal (62) after absorbing the heat, in this process;
S6, a cooling-supplying step implemented by making the heat-transferring liquid medium in the liquid-storing tank (12) enter said heat-releasing circuit (3), then enter the absorption refrigerating system (71) under the drive of the high-temperature canned motor pump (32), then making the absorption refrigerating system (71) continuously absorb the heat of the heat-transferring liquid medium to do work for refrigeration, then supply cooling to the cooling user terminal (72), next making the heat-transferring liquid medium flow back to the liquid-storing tank (12); and S7, a gas-supplying step implemented by opening the gas source tube (42) to make the low-temperature and high-pressure air in the gas-storing tank (41) enter the gas source tube (42); making the air outlet pipeline turn off and the air inlet pipeline turn on, of the gas-storing tank (41), in the off-state of said heat-releasing circuit (3) in S1; making the air outlet pipeline turn on and the air inlet pipeline turn off, of the gas-storing tank (41), in the on-state of said heat-storing circuit (2) in S2.

8. The energy storage and energy release method of the multipurpose multi-source heat-storing compressed air energy storage system of claim 7, wherein said packed bed heat-storing device (1) includes a packed bed (11) and a liquid-storing tank (12) connected to the outlet end of the packed bed (11), said heat-storing circuit (2) and said heat-releasing circuit (3) are connected to the packed bed (11) and the liquid-storing tank (12), and a pressure-stabilizing system (13) is connected to the inlet end of the packed bed (11).

9. The energy storage and energy release method of the multipurpose multi-source heat-storing compressed air energy storage system of claim 7, wherein said heat-storing circuit (2) includes a heat-storing pipeline, and a heat-storing heat exchanger (21) and a low-temperature canned motor pump (22) both connected in series to the heat-storing pipeline.

10. The energy storage and energy release method of the multipurpose multi-source heat-storing compressed air energy storage system of claim 7, wherein the heat-storing heat exchanger (21) and the heat-releasing heat exchanger (31) are connected to a compressor (23) and an expander (33), respectively.

11. The energy storage and energy release method of the multipurpose multi-source heat-storing compressed air energy storage system of claim 7, wherein said heat-releasing circuit (3) includes a heat-releasing pipeline, and the heat-releasing heat exchanger (31) and a high-temperature canned motor pump (32) both connected in series to the heat-releasing pipeline, and the expansion tank (34) is connected to the heat-releasing pipeline.

12. The energy storage and energy release method of the multipurpose multi-source heat-storing compressed air energy storage system of claim 7, wherein said gas-storing circuit (4) includes a gas-storing tank (41), and an air inlet pipeline and an air outlet pipeline both connected to the gas-storing tank (41), the air inlet pipeline and the air outlet pipeline are connected to the heat-storing heat exchanger (21) and the heat-releasing heat exchanger (31), respectively, and a gas source tube (42) is connected to the air outlet pipeline.

13. The energy storage and energy release method of the multipurpose multi-source heat-storing compressed air energy storage system of claim 7, wherein said photothermal circuit (5) includes a photothermal pipeline, and a photothermal collector system (51) and an electrical heater (52) both connected in series to the photothermal pipeline, the photothermal pipeline is connected with said heat-storing circuit (2), said heating-supplying circuit (6) and said cooling-supplying circuit (7).

14. The energy storage and energy release method of the multipurpose multi-source heat-storing compressed air energy storage system of claim 7, wherein said heating-supplying circuit (6) includes a heating-supplying heat exchanger (61) and a heating user terminal (62) connected with the heating-supplying heat exchanger (61), and the heating-supplying heat exchanger (61) is connected with said heat-releasing circuit (3) and said photothermal circuit (5).

15. The energy storage and energy release method of the multipurpose multi-source heat-storing compressed air energy storage system of claim 7, wherein said cooling-supplying circuit (7) includes an absorption refrigerating system (71) and a cooling user terminal (72) connected to the absorption refrigerating system (71), and the absorption refrigerating system (71) is connected with said heat-storing circuit (2) and said photothermal circuit (5).

* * * * *